US010527510B2

(12) United States Patent
Klein

(10) Patent No.: US 10,527,510 B2
(45) Date of Patent: Jan. 7, 2020

(54) SYSTEM, PROBE AND METHOD FOR MEASUREMENT OF FASTENER LOADING

(71) Applicant: Optech Ventures, LLC, Torrance, CA (US)

(72) Inventor: Marvin Klein, Torrance, CA (US)

(73) Assignee: Optech Ventures, LLC, Torrance, CA (US)

( * ) Notice: Subject to any disclaimer, the term of this patent is extended or adjusted under 35 U.S.C. 154(b) by 0 days.

(21) Appl. No.: 16/364,941

(22) Filed: Mar. 26, 2019

(65) Prior Publication Data
US 2019/0219466 A1     Jul. 18, 2019

Related U.S. Application Data

(63) Continuation of application No. 15/594,042, filed on May 12, 2017, now Pat. No. 10,345,173.

(60) Provisional application No. 62/350,251, filed on Jun. 15, 2016.

(51) Int. Cl.
*G01L 1/25* (2006.01)
*G01L 5/24* (2006.01)

(52) U.S. Cl.
CPC .............. *G01L 5/246* (2013.01); *G01L 1/255* (2013.01)

(58) Field of Classification Search
CPC ............ G01L 1/255; G01L 1/25; G01L 5/246
See application file for complete search history.

(56) References Cited

U.S. PATENT DOCUMENTS 5,675,087 A * 10/1997 MacLauchlan ........... G01L 1/25
73/597
5,970,798 A * 10/1999 Gleman .................. G01L 5/246
73/761

FOREIGN PATENT DOCUMENTS

EP        787980 A2 *  8/1997

* cited by examiner

*Primary Examiner* — Jamel E Williams
(74) *Attorney, Agent, or Firm* — Brian Billett

(57) ABSTRACT

In the present disclosure, embodiments including a system, probe and method are disclosed for accurately measuring the strain or extension of a fastener that occurs as the nut on the fastener is tightened and the fastener is put under load. The measurement technique is based on measurement of the time for an ultrasonic wave generated on one end of the fastener to travel a round trip through the fastener. As the fastener is tightened, the applied stress causes an associated increase in length. This length can be determined from a measurement of the increase in transit time. In various embodiments, the disclosed device and method uses laser ultrasonic testing (LUT), in which a pulsed laser generates the ultrasonic wave and a type of laser vibrometer detects the wave when it returns to the position of generation following a combination of longitudinal and shear wave reflections.

19 Claims, 7 Drawing Sheets

SYSTEM, PROBE AND METHOD FOR MEASUREMENT OF FASTENER LOADING

RELATED APPLICATIONS

This application claims the benefit of and is a continuation of non-provisional U.S. patent application Ser. No. 15/594,042, filed on May 12, 2017. This application for patent claims the benefit of provisional application 62/350,251, filed on Jun. 15, 2016. Both applications are incorporated herein in their entirety.

FIELD OF THE INVENTION

This field of this disclosure relates generally to measuring fastener load.

BACKGROUND

Measuring the load on a fastener during installation of the fastener is a long standing problem. As a general problem, the fastener load value should be optimized depending on the fastener, assembly materials and application. During a typical application, when a fastener is put into use, it is inserted into clearance holes in a multi-part assembly. A washer and nut are lightly threaded onto the end by hand. Tightening the fastener requires two people: one person fixing the head with a standard wrench and another person on the opposite side of the structure tightening the nut with a torque wrench. The nut is tightened to a specified level of torque. In this example, the torque wrench measures torque as a proxy for bolt load. This technique suffers from inaccuracy due to inconsistent or uncalibrated friction between the fastener and its mating hole. The torque applied must overcome the contact friction as well as loading the fastener. In alternative fastener installations, one end of the fastener or bolt may be integrated into the assembly directly, however, a torque wrench measurement still suffers the same shortcomings.

For assembly in critical areas, instrumented fasteners may be used. Instrumented fasteners have a transducer bonded to the head of the fastener. In typical applications, this transducer allows an ultrasonic measurement of the fastener extension, using a commercially available instrument for ultrasonic fastener load measurement. In available commercial ultrasonic instruments, ultrasonic vibration is induced mechanically at the transducer end of the fastener. In a typical use, the instrument then measures the arrival time of the induced wave that travels the length of the fastener, reflects from the opposite face and returns to the starting point. As the fastener is tightened to apply tensional stress, the fastener is put under positive strain and increases in length. At the same time, the sound velocity decreases through the acousto-elastic effect. An ultrasonic pulse propagating through a loaded fastener thus propagates a greater distance at a slower velocity than in an unloaded fastener, producing a time delay that can be used to determine the internal stress in the shank of the fastener.

In a maintenance or service environment it is desirable to measure the current load. However, there is no measurement reference point at zero load, so the transducer approach cannot be used. The use of applied torque for load measurement suffers from the same limitations described earlier.

Current commercial devices which perform transducer-based measurement of fastener extension have several problems including difficult, complex and cumbersome use due in part to the transducer-contact interface, cost, a limitation of the accuracy of the device and that the measurements were available in real time.

SUMMARY

In the present disclosure, embodiments including a system, device and methods are disclosed for accurately measuring the load on a fastener that occurs as the nut on the fastener is tightened. The measurement technique is based on measurement of the time for an ultrasonic wave generated on one end of the fastener to travel a round trip through the fastener. As the fastener is tightened to apply tensional stress, the fastener is put under positive strain and increases in length. At the same time, the sound velocity decreases through the acousto-elastic effect. An ultrasonic pulse propagating through a loaded fastener thus propagates a greater distance at a slower velocity than in an unloaded fastener, producing a time delay that can be used to determine the internal stress or load in the shank of the fastener. In order to determine the load from the change in arrival times, a model must first be developed that takes into account a number of factors including the length and diameter of the fastener, the placement of the threads, the longitudinal and shear velocity, the change in these velocities as a function of load, the fastener temperature and the velocities at this temperature and the internal path of the waves. As the load varies linearly with the change in arrival time, all the other factors can be used to calculate a slope, so the load can be determined by multiplying the slope by the change in arrival time.

In alternative embodiments where the fastener load needs to be measured in place without the benefit of measured reference signal, the user may be able to look up a previously recorded reference signal for the specific fastener. If this data is unavailable, then a combination of at least three measured signals may be used to determine load.

In various embodiments, the disclosed device and method uses laser ultrasonic testing (LUT), in which a pulsed laser generates the ultrasonic wave and a type of laser vibrometer detects the wave when it returns to the position of generation. Disclosed unexpected experimental results of ultrasonic reflected signal detection are incorporated into the probe detection of fastener load for increased measurement accuracy and reliability.

In various embodiments, disclosed is a compact, fiber optic probe that delivers both laser beams (generation and detection) to the end surface of the fastener. In an embodiment disclosed, the probe has an adapter at its end that allows it to be threaded directly to the end of the fastener. Various embodiments include adapters designed for fasteners of different diameter and thread pitch. In various embodiments, the small size of the probe allows rapid mounting and dismounting and provides for eye safety by completely encapsulating the end face of the fastener.

In various embodiments, the probe optical components overlap the two laser beams and focus them on the end surface of the fastener. The optical design of the probe is precise enough that no internal alignment is required. In order to maintain focus, the probe is seated into a designed standoff position after threading onto the fastener.

In various embodiments, the laser ultrasonic bandwidth available for probe generated and detected signals range to at least 125 MHz, providing a very accurate measurement of transit time and thus fastener extension. In various embodiments, the disclosed probe signal bandwidth provides a substantial increase in accuracy over current transducer based fastener load measuring devices due to the higher available bandwidth.

DETAILED DESCRIPTION

Figure 1:
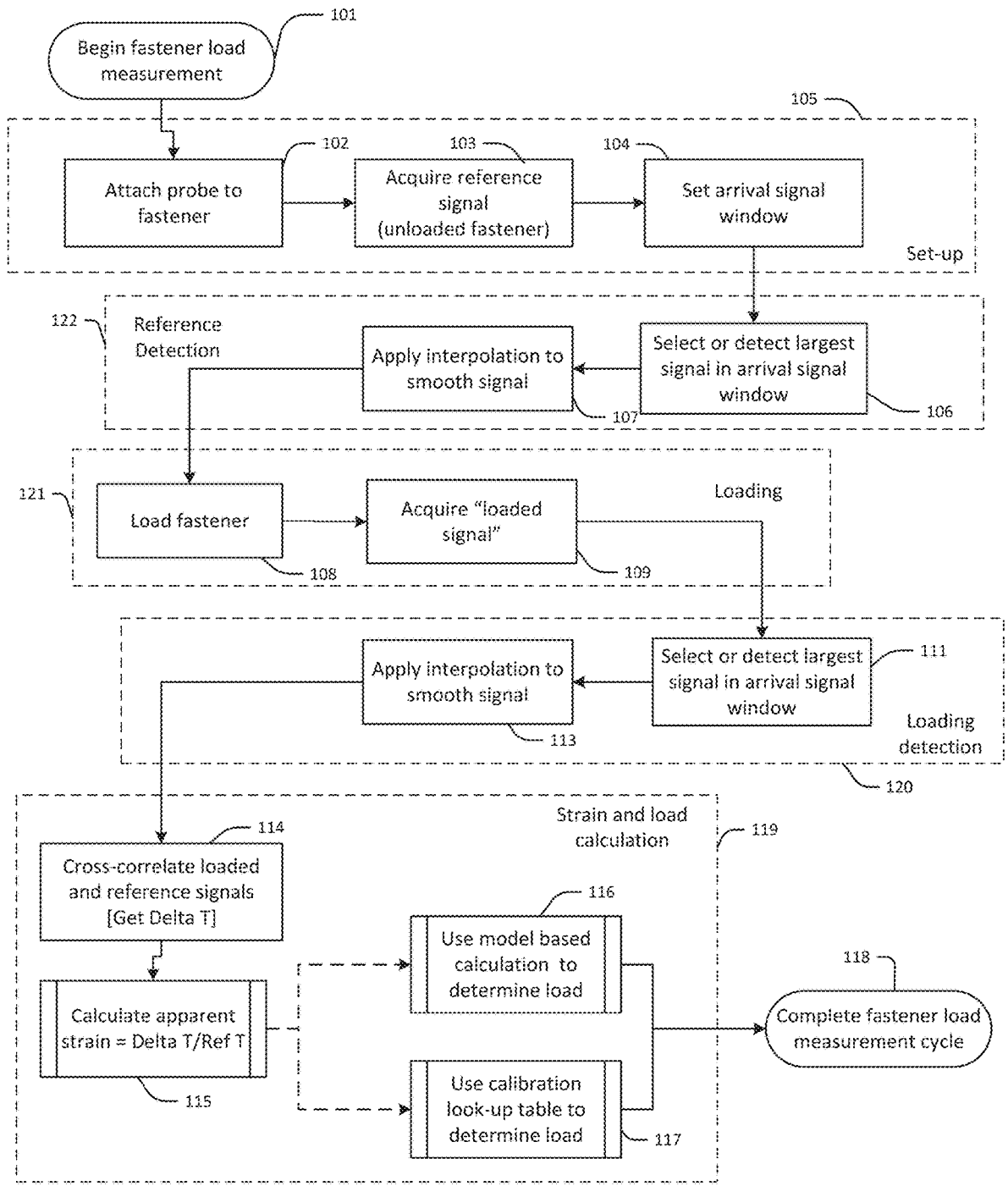
FIG. 1 shows a flow chart which outlines an embodiment methodology for laser ultrasonic measurement of fastener loading.

In various embodiments the round-trip travel times for a laser generated ultrasonic signal propagating the length of a fastener during unloaded and loaded conditions are determined by a cross-correlation of the identified signal peaks in the acquired signals. In contrast to conventional ultrasonic transducer probes, in various embodiments, only optical beams contact the end of the fastener, and the vibration is induced in a small spot rather than the larger area occupied by a transducer. As explained below, these differences in ultrasonic signal generation produce significantly different temporal signal characteristics. In various embodiments, the signal peak utilized to determine signal arrival time differences is not the expected direct round trip signal, but one which has reflected multiple times off the fastener walls and converted on its last reflection from a longitudinal wave to a shear wave. Note that omnidirectional beams are cause both by the small area of generation and by laser ablation effects.

In conventional fastener ultrasonic measurement systems, when a transducer is used to measure bolt extension, a 0° longitudinal wave transducer is selected. This conventional mechanical transducer generates a longitudinal wave that travels along the normal to the end surface, i.e. along the axis of the fastener. This wave reflects from the opposite surface (at the opposite end of the fastener) and returns to the point of generation, where it is detected. In this conventional ultrasonic transducer measurement, the path of the wave is simple and intuitive: it follows the central axis of the fastener.

In contrast to transducer based systems, in various embodiments of the present system, when generating ultrasonic waves in metals with a pulsed laser, there are two generation regimes: thermoelastic at low pulse energy and ablative at higher laser energy. The ablative regime is chosen for this application, as the longitudinal waves have much higher amplitude. In addition it is known that laser-generated longitudinal waves in the ablative regime are nearly omnidirectional: they are strongest along the normal to the surface, but the wave amplitude drops only gradually at larger angles to the surface normal. The broad angular range of the generated waves leads to an unexpected result: the strongest return signals correspond to waves that reflect several times on the sides of the fastener, while the direct axial signal is relatively weak. It is known that the strong signals correspond to reflected waves, as their arrival times are longer than the arrival time for the direct axial wave. A longer arrival time means a longer path length. In various embodiments, by measuring the arrival times of the largest signals, determining the path followed by the waves is possible. The strongest signals correspond to longitudinal waves that are generated off axis and reflect several times from the side walls as they propagate to the opposite face of the bolt and back again. It has also been observed that the very last reflection before returning to the end face converts the longitudinal wave to a shear wave. Such "mode conversion" happens at every point of reflection, but only the conversion at the last reflection is pertinent.

By way of explanation for these observed signal characteristics which are utilized in the implementation of various embodiments, one may consider several physical reasons why off-axis waves are stronger and why mode conversion to a shear wave on the last reflection is favored:

If the waves are looked upon as rays, then only one ray travels straight down the axis and back, while many rays (in the shape of a hollow cone) travel at a given angle to the axis. The cylindrical shape of the fastener captures all these off axis rays and bundles them together each time they pass through the axis of the fastener. Thus, off axis rays give a stronger signal in a cylinder than the single ray traveling down the axis.

The detection process at the end face uses a type of interferometer and is sensitive to out-of-plane motion of the surface. Thus, we must consider how the particle motion of the arriving waves couples to out-of-plane motion of the end surface. Longitudinal waves have their particle motion in the direction of propagation, while shear (or transverse) waves have their particle motion perpendicular to the direction of propagation.

As mentioned above the longitudinal waves traveling off-axis give larger signals when they rejoin on axis than the on-axis wave. However, as the angle to the axis increases, longitudinal waves couple poorly into out-of-plane motion of the end surface. By contrast, off-axis shear waves will couple better into out-of-plane motion of the end surface. This explains why the shear wave which converts at the last bounce is preferred for utilization as a reference signal in various embodiments.

Shown in FIG. 1 is a flow chart outlining an exemplar methodology for various embodiments for measuring fastener head loading 101. Various aspects and components of the method and apparatus are detailed further below and in the other drawings. The process begins by attaching the probe shown in FIGS. 3A-3C 301 to a fastener used in an assembly. As explained below, in various embodiments, the probe is designed to be attached to the fastener 102 after installation of a nut or loading component. Prior to loading the fastener, a reference signal is generated and recorded 103. In various embodiments, a temporal window is selected either automatically or manually from the acquired reference signal 104. In various embodiments, following the set-up phase 105, the reference signal detection is performed 122. In this phase, the highest peak in the arrival window is selected either manually or automatically 106 and the identified signal peak is smoothed by interpolation 107. During the loading phase 121, as the fastener is loaded 108, the probe generates and detects (or acquires) an ultrasonic signal 109. As with the reference signal, during the loading detection phase 120 the largest signal peak is selected manually or automatically 111. In the last phase, the strain and load calculation 119, the selected and interpolated reference and loaded signals are cross-correlated 114 to obtain the time difference [delta T]. Then the methodology may optionally either use a finite element based model 116 to compute the load or a calibrated look-up table based on empirical data 117 to compute the measured load, completing one cycle of measurement 118. The calibrated look-up table or model-based methodology incorporates correction of (1) the axial variation of the internal strain and stress of the fastener, (2) change in (shear and longitudinal) wave velocity with stress or load, (3) variation of wave velocity with temperature and (5) the non-axial propagation of waves in the fastener as exhibited in various embodiments disclosed herein.

Figure 2:
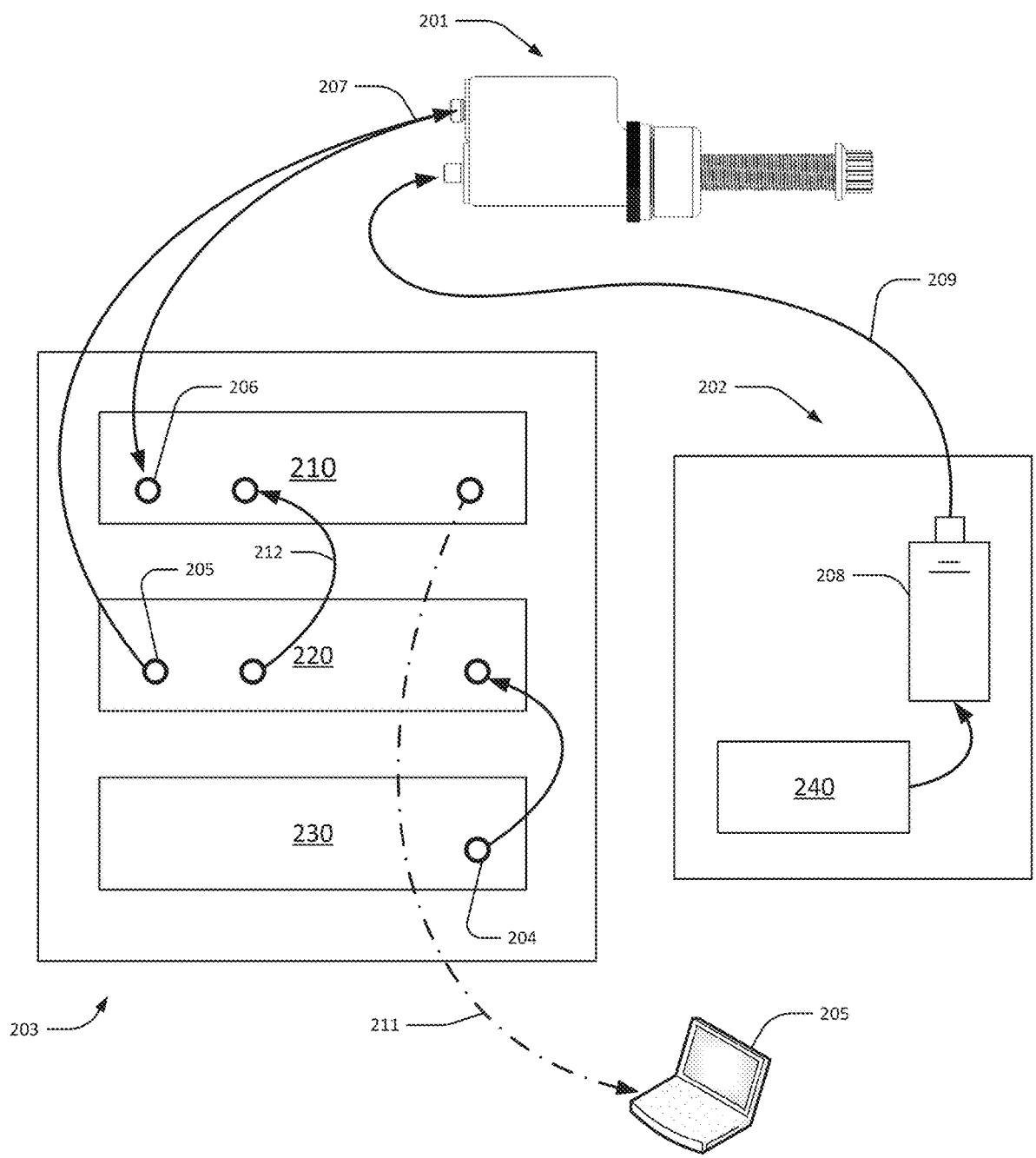
FIG. 2 shows an exemplar embodiment of the laser probe and associated measurement system components.

FIG. 2 is a component diagram for various embodiment of the measurement system utilizing the laser ultrasonic probe 201. The system components in various embodiments are generally divided between the probe 201, the laser ultrasonic generation components 202, the laser ultrasonic detection components 203, and the acquired signal digitizer and computer control component 205. In various embodiments, a control system 240 is utilized to operate the ultrasonic signal generation by controlling a pulsed Nd:YAG laser 208, which propagates the ablating laser pulses through the generation optical fiber 209 to the probe 201.

In various embodiments, the returning ultrasonic waves are detected using a detection laser 230, which sends the detection laser beam 204 to a variable fiber splitter 220 which splits the laser input between a reference beam 212 and detection beam 205. A receiver component 210 receives the signal back 206 from the probe 201 and converts the signal for output 211 for the digitizer.

Figure 3A:
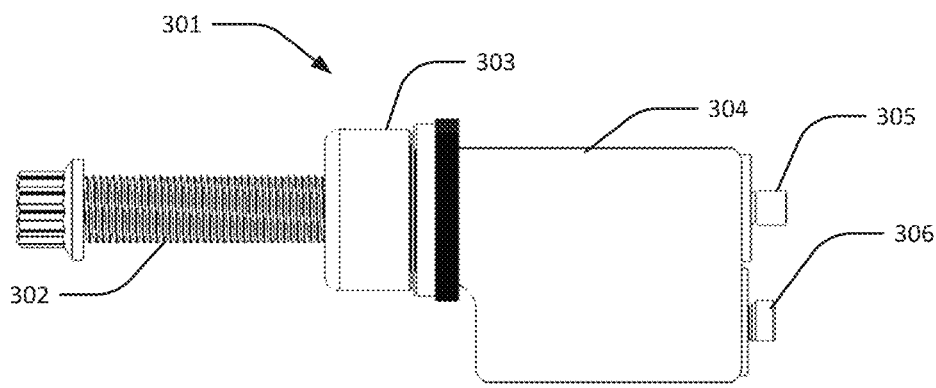
FIG. 3A shows a side view of an exemplar probe embodiment with a fastener attached.
Figure 3B:
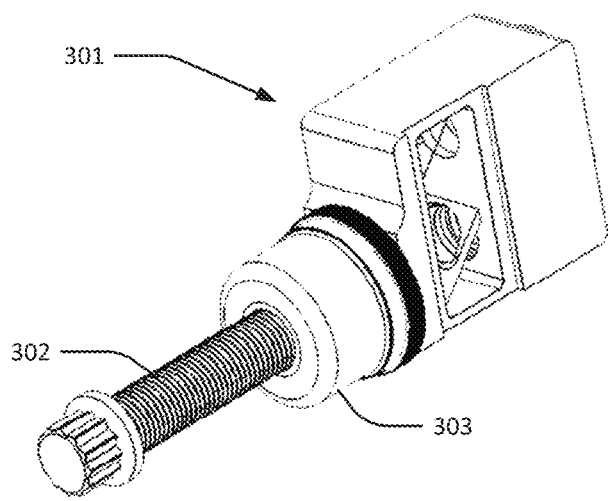
FIG. 3B shows a perspective view of an exemplar probe embodiment with a fastener attached.
Figure 3C:
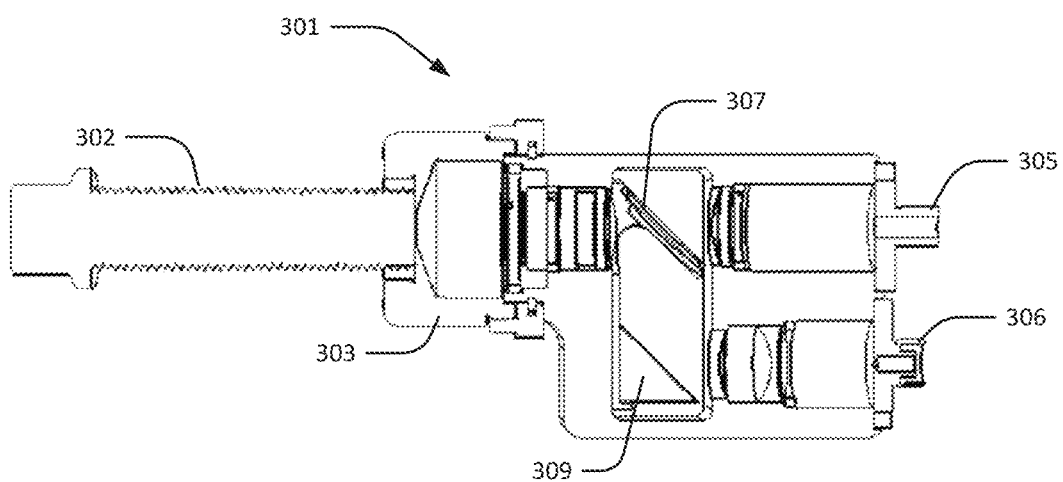
FIG. 3C shows a side cross section view of an exemplar probe embodiment with a fastener attached.

FIGS. 3A-3C show various views of an embodiment of the laser ultrasonic fastener probe 301. In FIG. 3A, the probe is shown in its case 304 from a side view. The probe case 304 is affixed to the fastener 302 with the probe collar 303 which is threaded onto the end of the fastener. Also shown are the connectors for the laser generation fiber 305 and laser detection fiber 306. FIG. 3B shows a perspective view of the probe 301 with a fastener 302 affixed to the probe by the probe collar 303. The probe collar is designed to thread onto the fastener without rotating the fastener or the probe. The diameter of the probe collar is designed to be large enough that internally-reflected shock waves from the ablation process arrive sufficiently late in time to avoid disturbing the desired signals.

FIG. 3C shows a side cross-sectional view of the probe 301 with an affixed fastener 302. The probe collar 303 is shown seated against the fastener end, demonstrating how the design provides a rapid and simple capability to mount the probe onto an assembly with the fastener positioned at a consistent distance from the probe optics. Also shown are the connectors for the laser generation fiber beam 305 and laser detection fiber beam 306, and optical components the turning prism 309 and dichromic beam combiner 307. Probe optics are further detailed below.

Figure 4:
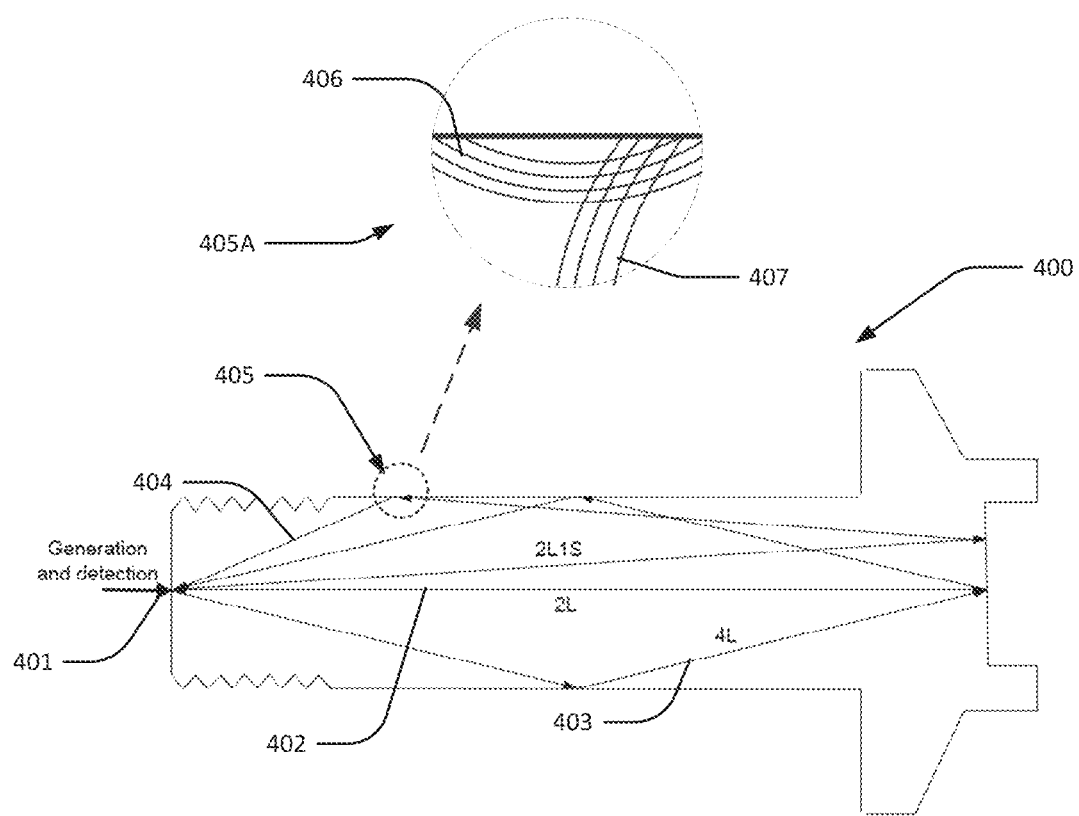
FIG. 4 shows a side cross section view of a fastener superimposed with exemplar trajectories of laser ablation generated ultrasonic signal trajectories.

FIG. 4 shows exemplar ultrasonic wave trajectories within a fastener. Ultrasonic waves emanate and return to the focal point for the laser ultrasonic generation and detection beams 401. Conventional transducer generated ultrasonic waves (and one trajectory of waves produced by the laser ultrasonic probe) have a predicable trajectory 402 which is twice the length of the fastener, here identified as "2L" which stands for 2 longitudinal wave segments. An exemplar trajectory consisting of 4 longitudinal wave segments is shown 403, as is a trajectory showing mode conversion on the last reflected wave segment "2L1S" for 2 longitudinal segments and 1 shear wave segment. Shown as an exploded view of the wave mode conversion point 405 in 405A are a depiction of the longitudinal wave 407 and shear wave 406 following the mode conversion.

Figure 5:
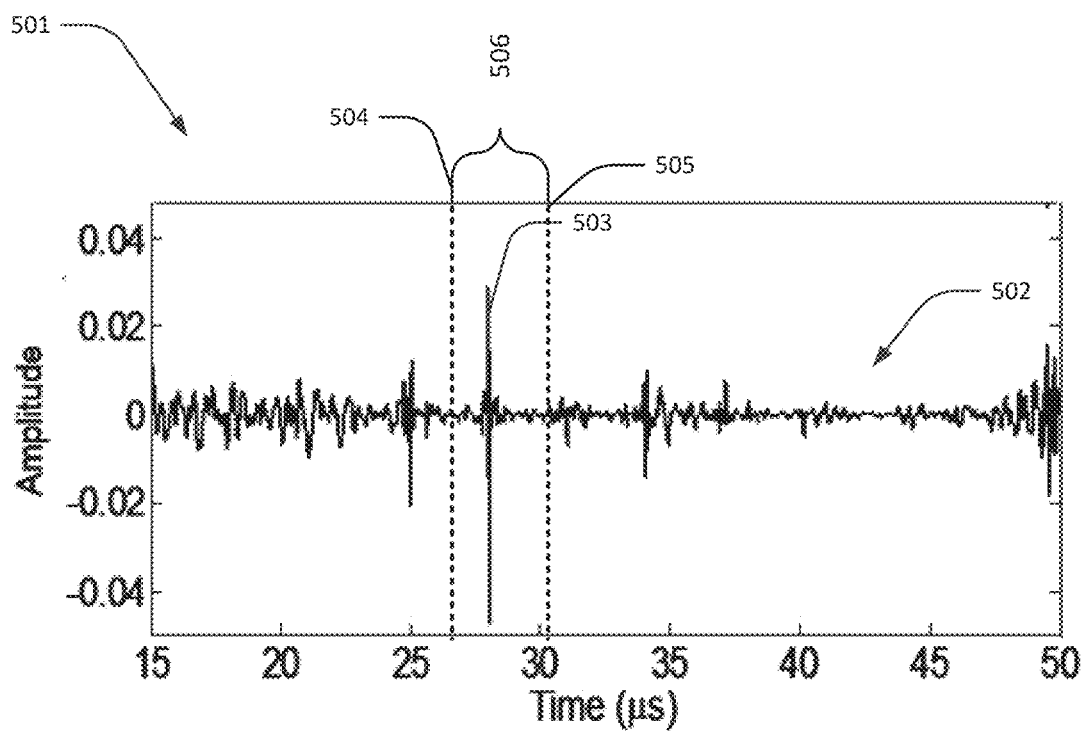
FIG. 5 shows the output from the laser detector signal showing the peak reflected signal detected.

FIG. 5 shows a graph 501 of an exemplar temporal signal 502 for an arrival reference or loaded signal with the peak detected reflected wave signal peak identified 503. Shown is an exemplar arrival window 506 which in various embodiments is determined either manually or automatically by the selection of boundaries 504 and 505.

Figure 6:
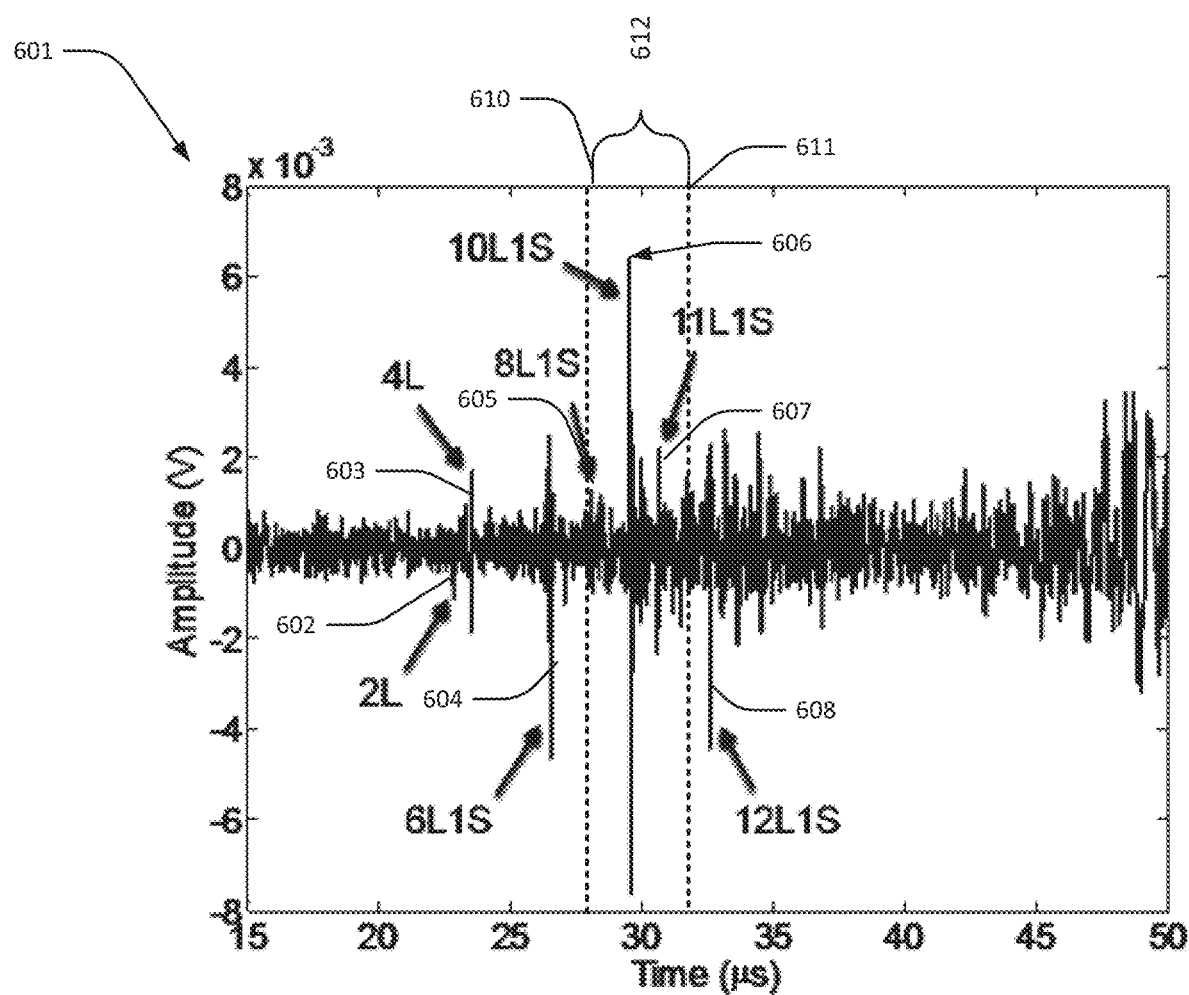
FIG. 6 shows the output from the laser detector signal showing various peaks of the reflected signal detected and an exemplar arrival signal selection window.

FIG. 6 shows a more detailed graph 601 of an exemplar temporal signal detected by the laser ultrasonic probe. Shown is an exemplar arrival window 612 which in various embodiments is determined either manually or automatically by the selection of boundaries 610 and 611. For this exemplar signal, the actual signal trajectories were calculated for various signal peaks including the conventional 2L detection 602, a detection of the 4L wave 603, a 6L1S wave 604, a 8L1S 605 wave, an 11L1S wave 607, a 12L1S wave 608, and the peak signal identified as the 10L1S wave 606. As can be seen from the exemplar detected signals in FIG. 6, the 2L signal 602 is difficult if not impossible to distinguish from signal noise. Solutions which rely upon the reflection of the simple 2L signal for determination of the length change thus suffer from the problem of a correctly identified and an effective signal detection.

Probe optics for various embodiments, explained in more detail below are identified in FIG. 7. The optical probe has two functions:

Optical: (1) each beam is delivered to the probe by its own fiber 702 and 703, (2) deliver the generation and detection beams in a coaxial, overlapped configuration to the center of the end surface 710 and (3) focus both beams at the designed standoff position and with the design spot diameter values.

Mechanical: incorporate adapters at the output end of the probe that accommodate fasteners with specific diameter and threaded pitch values, with all adapters positioning the end face at the desired standoff position.

Figure 7:
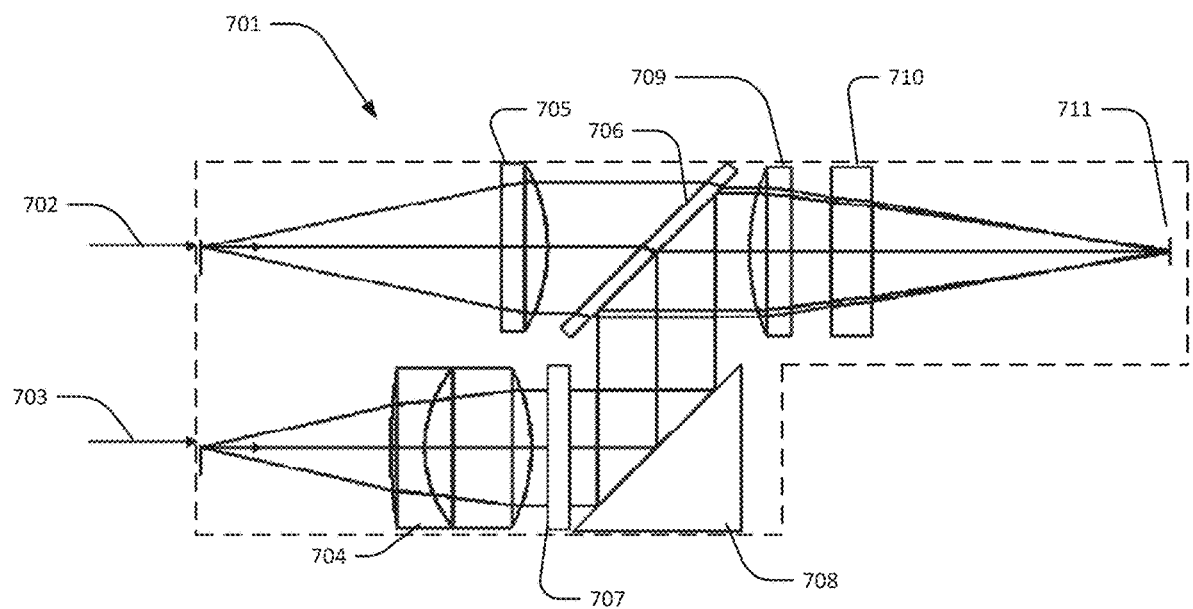
FIG. 7 shows an optics diagram for an exemplar embodiment of the laser probe.

As shown in FIG. 7, the probe 701 incorporates several optical elements:

A lens to collimate each input beam including the generating collimating lens 705 and the detection collimating lens 704;

A filter to block light from the generation laser from traveling into the detection path also called the blocking filter 707;

A turning prism 708 to turn the detection beam by 90 degrees;

A dichroic element to combine the detection and generation beams 706;

An objective lens 709 that focuses the two beams at a specified standoff distance and to specified spot diameters 711;

An easily replaceable output window 710 that protects the internal optics from dust.

In various embodiments, the laser ultrasonic fastener load measurement probe and system are utilized for fasteners in applications with one or both ends of the fastener exposed for attachment of the probe. In alternative embodiments the probe utilizes a connection interface to the fastener which may be affixed by threading the probe to the fastener. In alternative embodiments the probe utilizes a connection interface to the fastener which may be affixed by snapping the probe onto the fastener. In alternative embodiments the probe utilizes a connection interface to the fastener which may be affixed by mounting the probe onto to specially designed wrench used for loading the fastener.

In various embodiments, the laser ultrasonic fastener load measurement probe and system are utilized for fasteners in aerospace vehicle assembly, automotive assembly, critical building structural assembly, among other applications.

What has been described herein is considered merely illustrative of the principles of this invention. Accordingly, it is well within the purview of one skilled in the art to provide other and different embodiments within the spirit and scope of the invention.

What is claimed is:

1. A method for measuring a fastener load comprising:
generating and directing a first laser ultrasonic generation beam to a first end of the fastener when the fastener is unloaded;
generating and directing a first laser ultrasonic detection beam to the first end of the fastener when the fastener is unloaded;
acquiring by an optical sensor a reference ultrasonic signal while the fastener is unloaded;
loading the fastener;
generating and directing a second laser ultrasonic generation beam to the first end of the fastener when the fastener is loaded;
generating and directing a second laser ultrasonic detection beam to the first end of the fastener when the fastener is loaded;
acquiring by the optical sensor a loaded ultrasonic signal while the fastener is loaded;
determining a time difference between a peak identified in the unloaded reference signal and a corresponding peak identified in the loaded ultrasonic signal, wherein the peak identified in the unloaded reference signal and a corresponding peak identified in the loaded ultrasonic signal are the result of a mixture of longitudinal and shear waves which reflect several times from at least one side wall and once from an opposite end of the fastener prior to returning to a detection location on the first end of the fastener;
calculating a measured fastener load based at least in part on the time difference.

2. A method as in claim 1 wherein the generation and detection beams are directed by a probe attached to the fastener.

3. A method as in claim 1 wherein the probe may be attached to a threaded end of the fastener.

4. A method as in claim 1 wherein the probe may be threaded onto a threaded end of the fastener.

5. A method as in claim 1 wherein the probe may be attached to a rotationally torqued end of the fastener.

6. A method as in claim 1 wherein the generation and detection beams are combined with an optical element.

7. A method as in claim 1 wherein the generation and detection beams impinge on overlapping areas of the fastener.

8. A system for measuring a fastener load comprising:
a generating laser component which generates ultrasonic waves at a first end of the fastener;
a detecting laser component which generates an optic beam used for detecting ultrasonic waves at the first end of the fastener;
an optical sensor;
a probe which directs laser beams from the generating laser component and detecting laser component onto the first end of fastener;
wherein the generating laser component generates by a laser, a reference ultrasonic signal in the fastener when the fastener is unloaded and generates a loaded ultrasonic signal in the fastener when the fastener is loaded;
wherein the detection laser component and optical sensor acquires the detected reference ultrasonic signal at the first end of the fastener when the fastener is unloaded and acquires the loaded ultrasonic signal at the first end of fastener when the fastener is loaded;
wherein a peak in the reference ultrasonic signal is identified and a corresponding peak in the loaded ultrasonic signal is identified, wherein the peak identified in the unloaded reference signal and a corresponding peak identified in the loaded ultrasonic signal are the result of a mixture of longitudinal and shear waves which reflect several times from at least one side wall and once from an opposite end of the fastener prior to returning to a detection location on the first end of the fastener;
wherein the fastener load is determined at least in part on the time difference between the identified reference signal peak and the identified loaded signal peak.

9. A system as in claim 8 wherein the probe may be attached to a threaded end of the fastener.

10. A system as in claim 8 wherein the probe may be threaded onto a threaded end of the fastener.

11. A system as in claim 8 wherein the probe may be attached to a rotationally torqued end of the fastener.

12. A system as in claim 8 wherein the generation and detection beams are combined with an optical element.

13. A system as in claim 8 wherein the generation and detection beams impinge on overlapping areas of the fastener.

14. A probe for measuring a fastener load comprising:
a first input receptacle for a generating laser component which generates ultrasonic waves in the fastener;
a second input receptacle for a detecting laser component which generates optic beams used for detecting ultrasonic waves in the fastener;
optics which direct laser beams from the generating laser component and detecting laser component overlapped onto a first end of the fastener;
wherein the generating laser component generates by a laser, a reference ultrasonic signal in the fastener when the fastener is unloaded and generates a loaded ultrasonic signal in the fastener when the fastener is loaded;
wherein the detection laser component and optical sensor acquires the detected reference ultrasonic signal in the fastener at the first end when the fastener is unloaded and acquires the loaded ultrasonic signal in the fastener at the first end when the fastener is loaded;
wherein a peak in the reference ultrasonic signal is identified and a corresponding peak in the loaded ultrasonic signal is identified, wherein the peak identified in the unloaded reference signal and a corresponding peak identified in the loaded ultrasonic signal are the result of a mixture of longitudinal and shear waves which reflect several times from at least one side wall and once from an opposite end of the fastener prior to returning to a detection location on the first end of the fastener;
wherein the fastener load is determined at least in part on the time difference between the identified reference signal peak and the identified loaded signal peak.

15. A probe as in claim 14 wherein the probe may be attached to a rotationally torqued end of the fastener.

16. A probe as in claim 14 wherein the generation and detection beams are combined with an optical element.

17. A probe as in claim 14 wherein the optical element is a dichroic mirror.

18. A probe as in claim 14 wherein the generation and detection beams impinge on overlapping areas of the fastener.

19. A non-transitory computer readable medium storing a program for measuring a fastener load, comprising instructions, which when executed on a computer cause the computer to carry out the steps of:
- determining a time difference between a peak identified in the unloaded reference signal and a corresponding peak identified in the loaded ultrasonic signal, wherein the peak identified in the unloaded reference signal and a corresponding peak identified in the loaded ultrasonic signal are the result of a mixture of longitudinal and shear waves which reflect several times from at least one side wall of the fastener and once from an opposite end of the fastener prior to returning to a detection location on a first end of the fastener;
- calculating a measured fastener load based at least in part on the time difference.

* * * * *